Dec. 21, 1926.
A. J. GOLDEN
1,611,345
END PLAY BEARING FOR FORD CRANK SHAFTS
Filed April 25, 1923
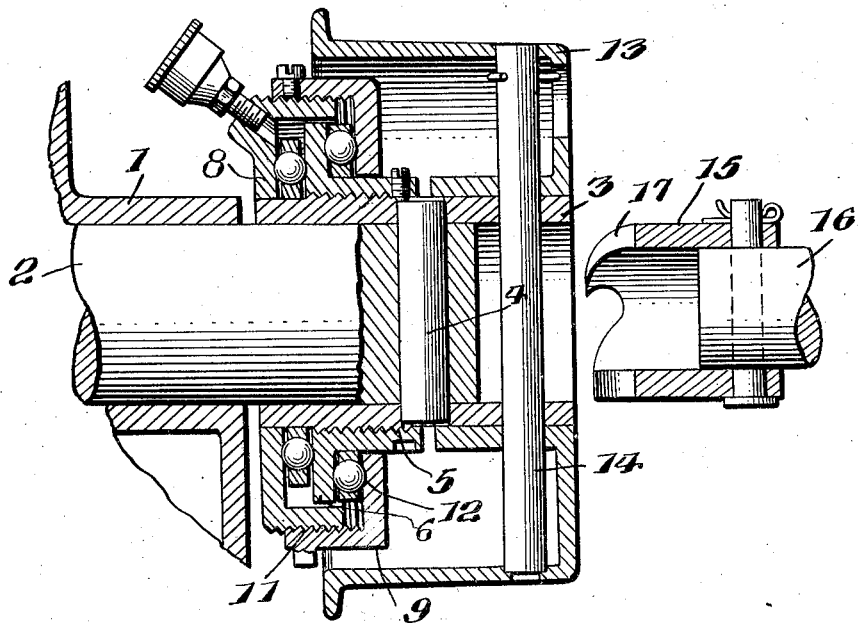
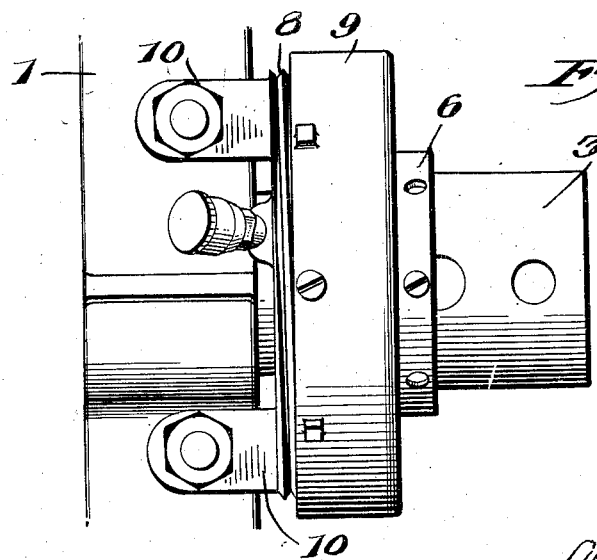
Inventor
Albert J. Golden Patented Dec. 21, 1926.

1,611,345

UNITED STATES PATENT OFFICE.

ALBERT J. GOLDEN, OF HARTSHORN, MISSOURI.

END-PLAY BEARING FOR FORD CRANK SHAFTS.

Application filed April 25, 1923. Serial No. 634,518.

This invention relates to improvements in crank shaft bearings for Ford automobiles, and has for its prime object to provide a device of this character that will reduce to a minimum the amount of end play in the crank shaft.

A further object of the invention is to provide a bearing for a crank shaft, which can be easily and quickly adjusted to take up for any play therein.

A still further object of my invention is to provide means for taking up the end play in Ford crank shafts so as to prevent the magnets from rubbing the field coil when in high and when being too far apart when in neutral to make sufficient spark.

And a still further object of my invention is to provide means whereby any Ford automobile owner can readily take up the end play of the crank shaft without going to the expense of having the engine disassembled for that purpose.

An additional object of my invention is to provide a device of the character indicated, which is simple in construction, durable, efficient for the purpose intended, and one that can be manufactured and installed on Fords at a relatively low cost.

These and like objects of the invention will be better understood as the description follows and as is specifically pointed out in the appended claims.

Referring to the accompanying drawing which forms a part of this specification and which clearly shows the construction and operation of my device—

Figure 1 is a side elevation of a portion of a Ford crank shaft showing my attachment applied thereto for taking up the end play, and Figure 2 is a top plan view of same.

Referring to the accompanying drawing in detail, like characters will be used to designate like parts in the different views.

In the drawing, the numeral 1 indicates a portion of an engine, of the well known Ford automobile, 2 the crank shaft, 3 a sleeve mounted over the end of the crank shaft and made stationary thereto by a pin 4.

A portion of the sleeve 3 on its outer face is provided with screw threads 5 intermediate its ends, for engagement with threads carried by an L-shaped adjusting plate 6.

The flange of the L-shaped plate 6 is in a housing formed by members 8 and 9. The member 8 is mounted on the sleeve 3, engaging a grooved portion adjacent its inner edge. The portion 8 of the housing is held against movement by means of brackets 10 secured in any suitable way to the engine 1, as is clearly indicated in Figure 2.

The second half of the housing, or the portion 9, is mounted on the outer face of the adjusting plate 6 and is provided with interior threads for engaging the interior threads of the portion 8 as at 11.

The flange of the L-shaped adjusting plate is spaced apart from the housing 8 and 9 by means of ball bearings 12.

A fan belt pulley 13 is secured to the sleeve 3 by means of a pin 14.

A sleeve 15 mounted on the end of a crank 16 is provided with a ratchet face as at 17 for engagement with the pin 14 in starting the engine.

When any end play has taken place in the crank shaft 2, same can be taken up by screwing the adjusting plate 6 either to the right or left, whichever may be desired in moving the field coils towards or away from the magnets, thus saving the expense of taking the engine apart for the purpose of eliminating end play in the crank shaft.

In view of the foregoing description of my invention taken in connection with the accompanying drawing, it is thought that any further explanation as to the construction, operation, and objects of the invention is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. In a device of the character described, comprising a crank shaft, a housing about said crank shaft, a sleeve secured to said crank shaft, an annular plate adjustable in either forward or rearward direction upon said sleeve, means for locking said plate to said sleeve, a ring member angular in cross section secured to said housing about said crank shaft adapted to engage said plate for preventing end movement of said crank shaft in one direction, a second ring member angular in cross section attached to said first mentioned ring member adapted to engage the opposite side of said annular plate for preventing end movement of the crank shaft in the opposite direction and bearing balls interposed between the ring members and said plate, said ring members forming a housing about said annular plate.

2. The combination with the crank shaft of an internal combustion engine, a crank case, and the fan belt pulley attached to the crank shaft, of an element rigidly connected with said crank case, a sleeve having threaded connection with said element, and a pair of opposing thrust bearings between said sleeve and parts of said pulley holding the crank shaft from longitudinal oscillation in both directions.

3. The combination with the crank shaft of an internal combustion engine, and a hollow pulley attached to said shaft, of a sleeve extending into said pulley, a device for holding said sleeve from turning with said pulley, and thrust bearings enclosed within the pulley between said sleeve and said pulley.

4. The combination with the crank shaft of an internal combustion engine and a hollow pulley attached to said shaft, of a sleeve extending into said pulley, a device for holding said sleeve from turning with said pulley, and thrust bearings between said sleeve and said pulley acting to thrust said pulley in opposite directions.

In testimony whereof, I have affixed my signature.

ALBERT J. GOLDEN.